May 24, 1966 R. M. GITLIN 3,252,343
ANGULAR ERROR COMPENSATING DEVICE
Filed April 24, 1964 4 Sheets-Sheet 1

INVENTOR.
ROBERT M. GITLIN
BY
Kane, Dalsimer and Kane
ATTORNEYS

May 24, 1966 R. M. GITLIN 3,252,343
ANGULAR ERROR COMPENSATING DEVICE
Filed April 24, 1964 4 Sheets-Sheet 2

INVENTOR.
ROBERT M. GITLIN
BY
Kane, Dalsimer and Kane
ATTORNEYS

May 24, 1966 R. M. GITLIN 3,252,343
ANGULAR ERROR COMPENSATING DEVICE
Filed April 24, 1964 4 Sheets-Sheet 3

INVENTOR.
ROBERT M. GITLIN
BY
Kane, Dalsimer and Kane
ATTORNEYS

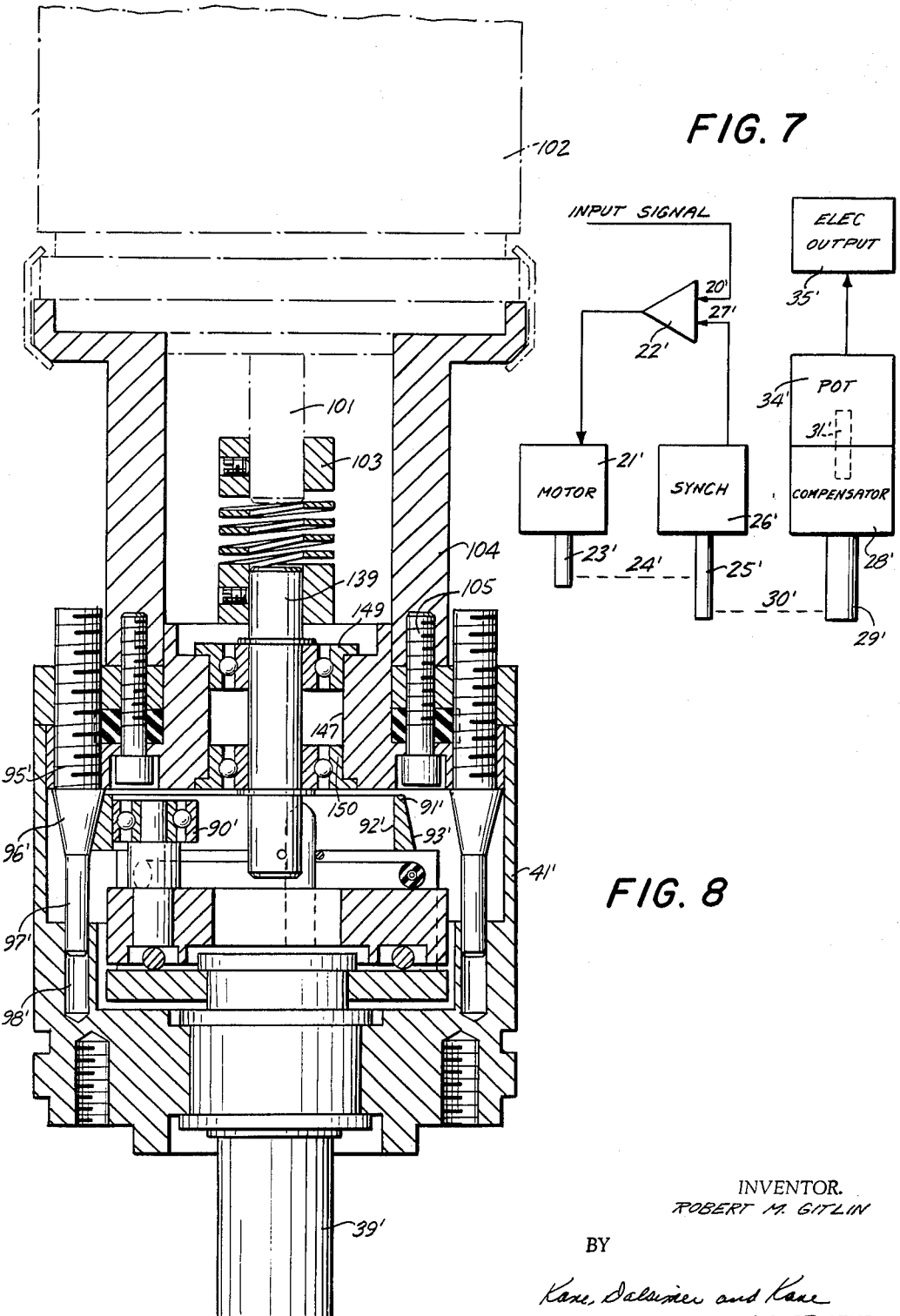

United States Patent Office 3,252,343
Patented May 24, 1966

3,252,343
ANGULAR ERROR COMPENSATING DEVICE
Robert M. Gitlin, East Meadow, N.Y., assignor to American Aerospace Controls, Inc., Farmingdale, N.Y.
Filed Apr. 24, 1964, Ser. No. 362,437
1 Claim. (Cl. 74—63)

This invention relates generally to compensating devices and more particularly to a mechanical device for compensating for repeatable angular errors in a servo system.

In "follow-up" systems such as servo systems wherein rotating components are used, many errors occur which are repeatable and predictable. Various devices have been designed for use in these systems to correct or compensate for these errors. For the most part these devices have been cumbersome and unreliable.

The invention disclosed herein has as its principal object the provision of a unique mechanical angular error compensating device to be used in measurement, control and computing equipment to correct for inaccuracies, such as repeatable angular position errors, design parameter uncertainties, time associated system changes and potentiometer loading errors.

It is another object of the invention to provide an angular error compensating device which is suitable for limited space applications and which can be adjusted over a range of 360° by axial access.

It is a further object of the invention to provide a device enabling an operator to compensate for magnetic deviation errors in a magnetic navigational servo system.

It is still another object of the invention to provide an angular error compensating device which can be utilized as a standard component, and which can be provided for mechanical or electrical output.

It is a further object of this invention to provide an angular error compensating device having concentric input and output shafts which can be used in a synchro mounting.

An angular error compensating device embodying the invention and the manner of using the same is described herein with references to the drawings, in which:

FIG. 7 is a diagrammatic representation of a typical servo system utilizing an angular error compensating device in tandem; and FIG. 8 is a longitudinal sectional view of an alternate embodiment of an angular error compensating device used in tandem.

Figure 1:
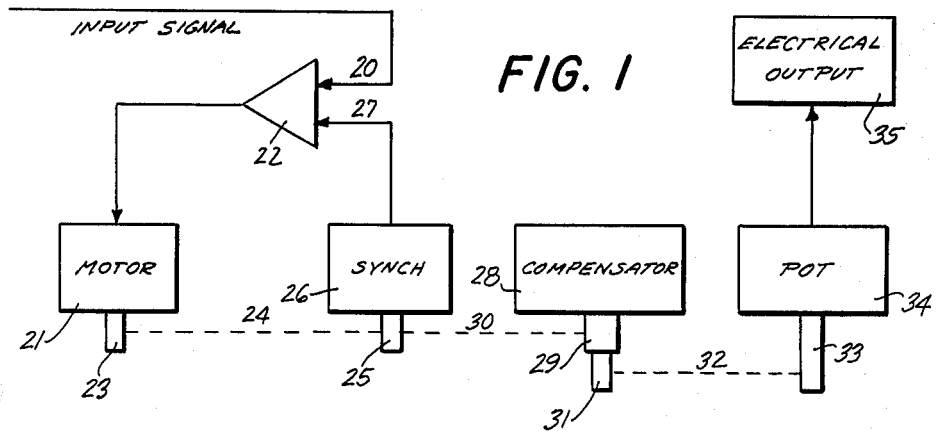
FIG. 1 is a diagrammatic representation of a typical servo system utilizing an angular error compensating device.

In FIG. 1 a portion of a typical servo system utilizing the invention is illustrated. In the figure an electrical input signal 20 is shown driving a motor 21 through amplifier 22 and the output shaft 23 of the motor is coupled through gearing 24 to the shaft 25 of synchro 26. An electrical output 27 is taken from synchro 26 and fed back to the input of the system through amplifier 22 as is typical in systems of this type. With such an arrangement as that shown in FIG. 1 and thus far described, imperfections in the synchro due to manufacture result in a ratio between synchro input and synchro output which may vary according to the position of the rotating portion of the synchro. Each synchro has a repeatable error built into it which depends upon the position that the synchro rotating component has. Thus, if a synchro such as 26 is calibrated to give an electrical output signal X when the rotating component is at the 0° position, multiplying the shaft position by a factor of N will not automatically multiply the output electrical signal X by a factor of N even though the calibrated ratio is fixed. This is a direct result of a position error. Most systems of this type contain position sensitive components. The error thus introduced is repeatable over 360° of rotation of the synchro shaft. In order to correct for this error and enable proper calibration of the system, compensating device 28 is provided. Input shaft 29 of compensating device 28 is mechanically coupled to shaft 25 of synchro 26 through coupling 30 and the output shaft 31 is linked through mechanical coupling 32 to shaft 33 of potentiometer 34 which provides an electrical output 35. In a system such as that shown in FIG. 1 the electrical output 35 rather than electrical output 27 is fed back into amplifier 22 to close the loop.

Figure 2:
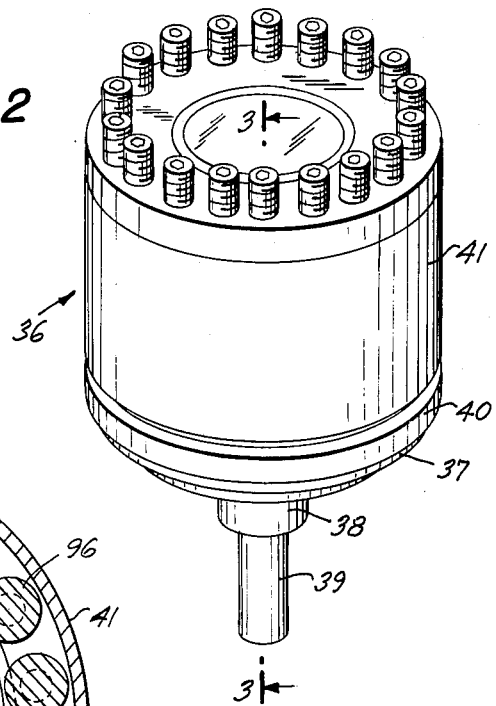
FIG. 2 is a top perspective view of an angular error compensating device constructed in accordance with the teachings of this invention.
Figure 5:
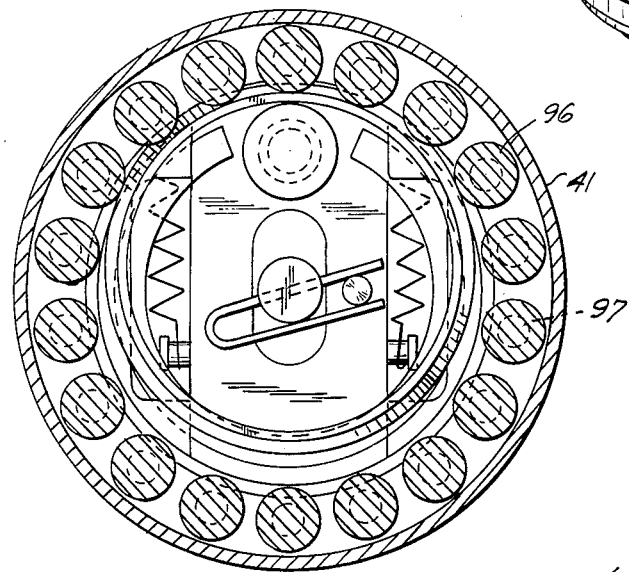
FIG. 5 is a sectional view taken along the line 5—5 in the direction of the arrows as indicated in FIG. 4.

An angular error compensating device constructed in accordance with the teachings of this invention is shown in FIGS. 2 through 6 and indicated therein by the numeral 36. Compensating device 36 is provided with a substantially cylindrical casing or housing formed of anodized aluminum such as its standard in the art for rotating components and is provided wtih concentric input and output shafts extending from the compensating devices mounting face 37. The input and output shafts are indicated in the figures by the numerals 38 and 39, respectively. The device is designed to be mounted on a gear plate in a manner similar to that used for other rotating components and can be mounted with a servo clamp or screw mounting. As shown in FIG. 2 the casing is provided with mounting ring 40 for clamp mounting.

Housing 41 is itself provided with a central cylindrical bore 42 and bearings 43 and 44 set into bore 42 by a press fit. Bore 45 of larger diameter than bore 42 is provided having the same central axis as bore 42 and bore 46 is also provided between bores 42 and 45 having the same central axis and being of intermediate diameter.

Bearings 43 and 44 mount input shaft 38 in housing 41. Input shaft 38 is a longitudinal shaft having a central cylindrical bore 47 with its upper end mounting, by a press fit, disk 48 which appears as a circular flange thereof. Bearings 49 and 50 are set in bore 47 by a press fit and support output shaft 39. The output shaft is a solid cylindrical shaft and is provided with grooves 51 and 52 which mount retainer rings 53 and 54. Retainer rings 53 and 54 prevent axial movement of output shaft 39 with respect to input shaft 38. Input shaft 38 is restrained from axial movement with respect to housing 41 by means of retainer 55 fitted in groove 56 of input shaft 38 and the abutment of the inner race of bearing 43 against shoulder 57 of input shaft 38.

Thus, input shaft 38 and output shaft 39 are free to rotate with respect to one another about a common axis and the combination is free to rotate about the axis of housing 41 and relative to housing 41. The assembly, however, is restrained from longitudinal motion as to one component with respect to another.

The input and output shafts are coupled to each other through the use of coupling members. One coupling member is provided by transverse slide support 58 consisting of disk 48 and upwardly projecting skirt portions 59 and 60 which are separated by openings 61 and 62, and which provide facing recesses 63 and 64. Transverse slide support 58 is rigidly attached to input shaft 38 by a press fit between the circumferential wall of cylindrical hole 65 in disk 48 and cylindrical peripheral surface 66 of input shaft 38. A second coupling member is provided by transverse slide 67 which is somewhat rectangular in horizontal cross-section with each of its ends 68 and 69 arcuately formed on a radius approximating the radius of skirt portions 59 and 60. Transverse walls 70 and 71 form with depending ends 68 and 69, respectively, transverse channels 72 and 73, receiving rolls 74 and 75, respectively, which support slide 67 above the surface of disk 48 of slide support 58 with ends 68 and 69 within openings 62 and 61.

Springs 76 and 77 with ends attached to slide support 58 at pins 78 and 79, respectively, and to slide 67 at pins 80 and 81, respectively, yieldingly urge transverse slide 67 into a position with its lengthwise axis equidistant from skirts 59 and 60. Circular retaining spring 82 received in groove 83 formed in skirts 59 and 60 prevents movement of slide 67 in an axial direction away from member 58 while permitting transverse movement in a horizontal plane against the tension of springs 76 and 77.

Slide 67 supports coupling pin 83 projecting upwardly and receives between legs 84 and 85 of spring coupling member 86, which is in the form of a U, providing zero backlash. A leg of member 86 passes through opening 87 in output shaft 39 and is retained therein by a press fit. The relative diameters of opening 87 and leg 84 projecting therethrough are such that a tight fit between the two is achieved rigidly maintaining U coupling member 86 in attachment with output shaft 39. The distance between legs 84 and 85 approximates the diameter of coupling pin 83 so that a relatively close fit between the two members is provided. The upper end of shaft 39 projects through elongated slot 88 in coupling member 67 so that the contact between U coupling member 86 and coupling pin 83 is accomplished above coupling member 67 with output shaft 39 projecting downwardly and within input shaft 38 beneath slide 67.

It is noted, therefore, that shafts 38 and 39 are coupled through coupling members 58 and 67 and rotational movement of input shaft 38 is transmitted to slide support 58 and then to transverse slide 67 through springs 76 and 77 and to output shaft 39 through coupling pins 83 and 86.

Figure 4:
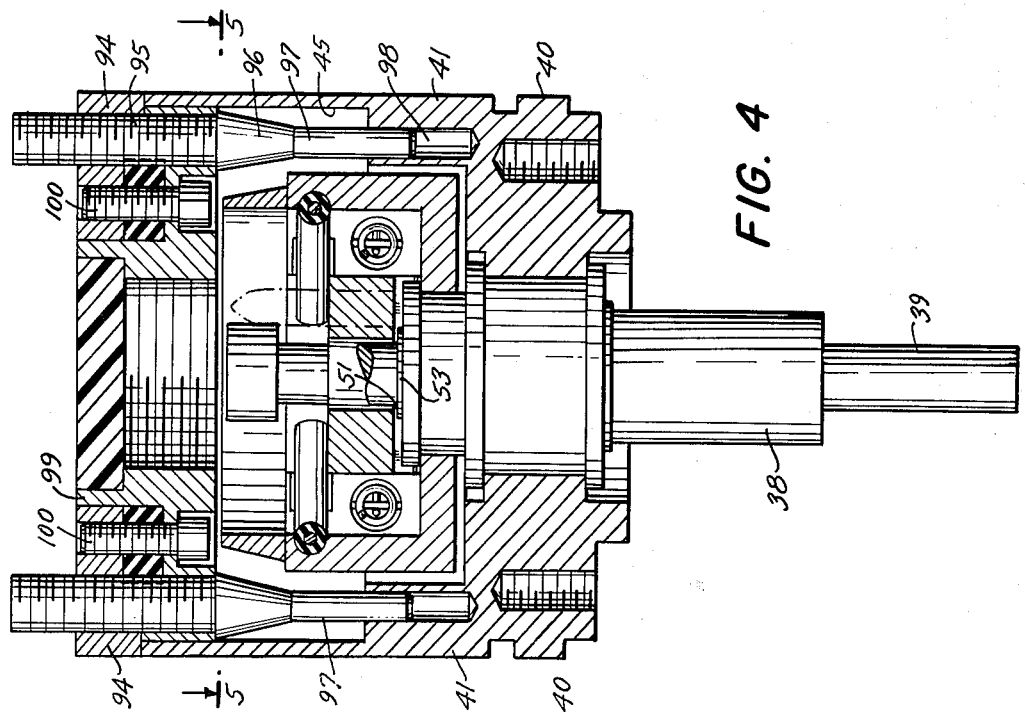
FIG. 4 is a longitudinal sectional view of the angular error compensating device shown in FIG. 3 taken along the line 4—4 in the direction of the arrows as indicated in FIG. 3.
Figure 3:
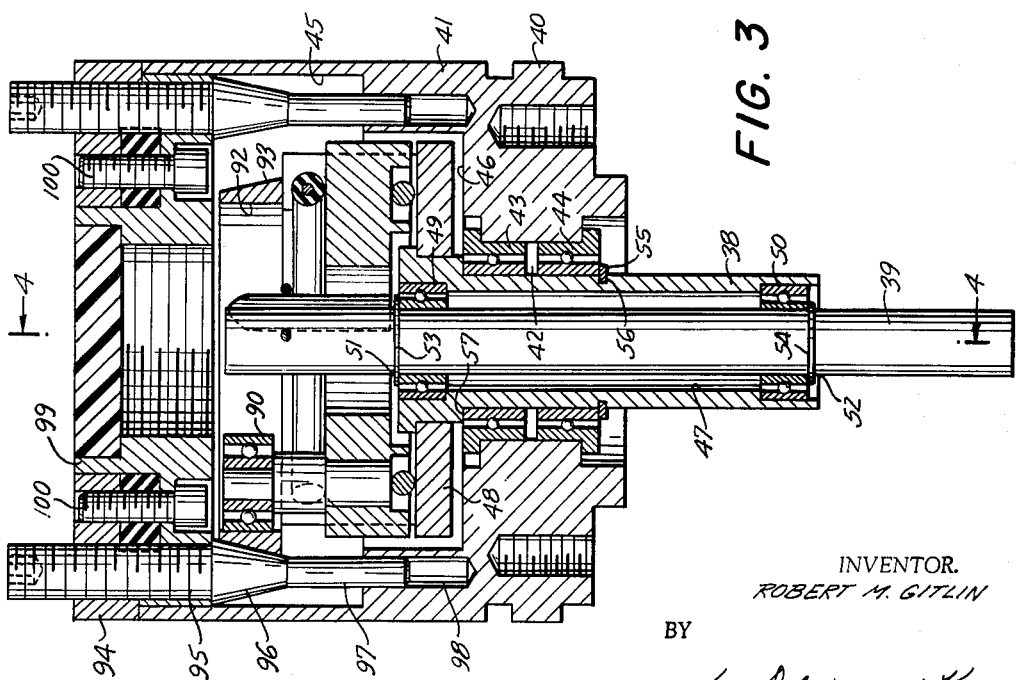
FIG. 3 is a longitudinal sectional view of the angular error compensating device shown in FIG. 2.
Figure 6:
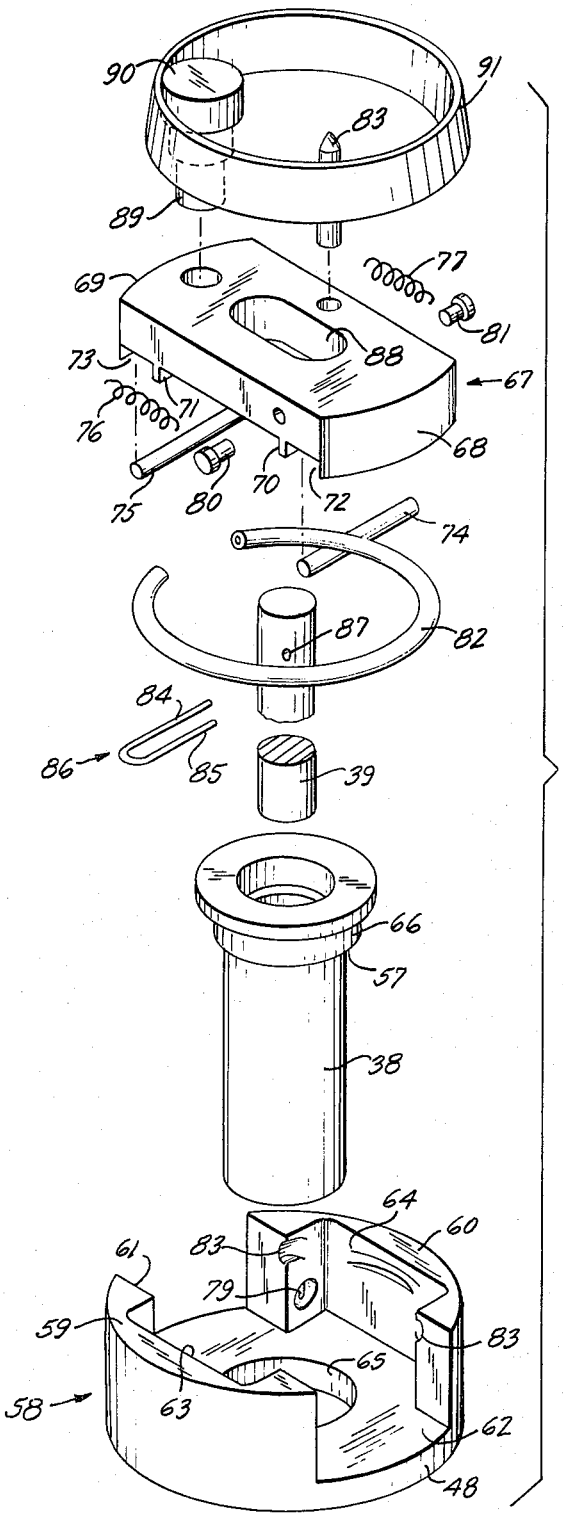
FIG. 6 is an exploded view of the interior components of the angular error compensating device shown in FIG. 2 removed from the casing.

Slide 67 supports vertically shaft 89 and roller 90 at one end thereof. Shaft 89 is supported near end 69 of slide 67 and roller 90 is a cam follower in a combination whereby the cam is provided by non-resilient, trapezoidal cross-section steel ring 91 surrounding the input and output shafts and which is formed with a uniform inside diameter throughout its height which provides a contact surface 92 against which cam follower 90 acts. The outside surface of ring 91 is indicated by the numeral 93 and is in the form of an inclined surface having a constantly increasing outside diameter from top to bottom as seen in FIGS. 3 and 4.

Cap 94 is provided with longitudinal slots therein to allow passage therethrough of a plurality of adjustment screws 95 each of which is provided at its lowermost end with a conical portion 96 set in the horizontal plane of ring 91. The longitudinal position of each screw 95 determines the cross-section of its cone which will lie in the plane of ring 91. If all screws 95 are in the same relative longitudinal position, an identical cone cross-section or diameter of each screw will lie in the plane of the ring with the inner surfaces of the plurality of cones providing a perfect circle in the plane of the steel ring. The ring is disposed loosely in position and although restrained from axial movement it is free to move in its horizontal plane and the area on its outer surface 93 opposite the area of the inner surface in contact with follower 90 is pressed against adjacent cones 96, due to the action of springs 76 and 77. Each of the adjustment screws is provided with a cylindrical portion of reduced diameter 97 beneath the conical portion which is set in a respective hole 98 within casing 41 to prevent movement in a horizontal plane of the respective adjustment screw.

The device can also be provided with a cap portion 99 and screws 100 for mounting purposes if it is desired.

The operation of the device disclosed in FIGS. 1–6 will now be considered with reference to the description above. Rotation of input shaft 38 in the combination is transmitted to slide support 58 and is further transmitted to slide 67 through springs 76 and 77. Rotation of transverse slide 67 results in the rotation of output shaft 39 since it is coupled to slide 67 through coupling pin 83 and U-member 86. It is noted, however, that slot 88 through which shaft 39 extends in slide 67 is elongated with its major axis directed toward cam follower 90 and perpendicular to rollers 74 and 75. Springs 76 and 77 yieldingly urge transverse slide 67 toward ring 91 and yieldingly urge cam follower 90 adjacent inner surface 92 of ring 91 which urges the outside surface 93 of the ring adjacent the contour provided by the plurality of cones 96. The contour, in effect, provides a backing for the ring in the area of the ring on surface 93 opposite the area where the roller contacts the inner surface of ring 91. If the contour provided by the cones is in the form of a perfect circle (all cones equally displaced axially) then the rotational movement of input shaft 38 will be accurately transmitted to output shaft 39. If there are deformities in the track, the rotational movement of input shaft 38 will be modified or altered since the slide 67 will be moved with respect to output shaft 39 since cam follower 90 will be moved toward or away from output shaft 39. The rotational movement of output shaft 39, therefore, is a combination of the rotational movement of input shaft 38 and the uniformity of configuration of the track provided by the cones. If the circle defined by the cones is perfectly regular or a perfect circle, the relationship between the input and output shafts is one-to-one. If, however, the contour is modified in configuration by longitudinal displacement of one or more adjustment screws 95 so that there are irregularities in it, the one-to-one ratio of input to output is upset and modified. The ratio is dependent upon the axial position of the various adjustment screws 95 since the axial position of each adjustment screw 95 determines the distance from the central axis of the transverse slide at which the cone portion 96 will be engaged by the outer surface 93 of the ring 91. Since a plurality of adjustment screws are provided, variations in configuration of the track in response thereto can be effected by rotation of the screw members 95 over the 360° angle. Thus, the ratio of input to output shafts can be modified or changed at any desired angle over the 360° angle of rotation. With such an arrangement, repeatable angular position errors can be compensated for by simply adjusting the plurality of screws 95 to differentially advance or retard the output shaft with respect to the input shaft and in this manner to compensate for the repeatable angle position errors in the servo system.

The contour provided by the plurality of cone surfaces 96 provides the compensation. The non-deformable steel band 91 provides a smoothing or integrating effect preventing the roller from undergoing instantaneous "jumps" or undesired radial movements between cone surfaces thus avoiding positional errors, a "bumpy" movement due to the compensating device.

If it is desired, a potentiometer or other suitable rotating electrical component can be provided and mounted in tandem on the angular error compensating device with the potentiometer shaft being the output shaft of the compensating device. Thus, the compensating device would provide an electrical output without the necessity of gearing a potentiometer to the mechanical output shaft 39. In FIGS. 7 and 8 such an arrangement is shown wherein the potentiometer is mounted in tandem with the angular error compensating device. In FIG. 7 input signal 25 is shown driving a motor 21′ through amplifier 22′ and the output shaft 23′ of the motor is coupled through gearing 24' to the shaft 25' of synchro 26'. An electrical output 27' is taken from the synchro 26' and fed back to the input of the system through amplifier 22' as is typical in systems of this type and as is shown in FIG. 1 herein. Angular error compensating device 28' is provided with the input shaft 29' mechanically coupled to shaft 25' of synchro 26' and through coupling 30' and linked entirely through shaft 31' to potentiometer 34' to provide electrical output 35'.

In FIG. 8 the arrangement is shown in cross-section and it is noted that the angular error compensating device disclosed therein is identical with the angular error compensating device previously described with the exception of the output shaft and the addition of the potentiometer and coupling shaft 139 supported in bearings 149 and 150 within bore 147 in casing 41' of the angular error compensating device. In the embodiment of the invention shown in FIG. 8 parts therein identical with parts shown in the embodiment of FIGS. 1-6 are given the same number as previously with a prime so that the casing is indicated by the numeral 41', the input shaft by the numeral 38', the steel band by the numeral 91' with its inside and outside diameters indicated by the numerals 92' and 93', the cam follower by the numeral 90'. The conical portion 96' of screw 95' with cylindrical portion 97' thereof in groove 98' within casing 41' is also shown as are the remaining parts. In this embodiment, however, the output shaft 39 is omitted but coupling shaft 139 is provided in place thereof which is connected to the shaft 101 of potentiometer 102 by coupling 103 so that the rotation of shaft 101 by shaft 139 is effected by the angular error compensating device in the same manner that the rotation of output shaft 39 by input shaft 38 is effected in the embodiment previously described. The potentiometer 102 is mounted to the angular error compensating device by sleeve 104 and screws 105.

The angular error compensating device disclosed in the figures and described above provides a reliable device for use in correction of angular positional errors in a system utilizing rotating components.

Thus, among others, the several objects in the invention, as specifically aforenoted, are achieved. Obviously numerous changes in construction and rearrangement of parts might be resorted to without departing from the spirit of the invention as defined by the claim.

I claim:

An angular error compensating device including in combination a casing, concentric input and output shafts supported in said casing rotatably with respect to said casing and each other, an upwardly facing enlarged planar radial surface of said input shaft perpendicular to the axis thereof, a first coupling member supported on said planar surface and movable with respect thereto, first and second upwardly projecting skirt portions of said input shaft, an elongated vertical slot formed in said first coupling member, perpendicularly disposed major and minor axes of said elongated slot, said minor axis having a dimension slightly greater than the dimensions of said output shaft and said major axis having a dimension greater than the dimension of said minor axis, a cam follower mounted on said first coupling member and disposed on the projection of said major axis in the plane of said planar surface, said output shaft projecting upwardly through said slot, first and second springs, said first spring attached at one end to said first skirt and at its remaining end to said first coupling member, said second spring attached at one end to said second skirt and at its remaining end to said first coupling member, said springs yieldingly urging said first coupling member and said cam follower in a direction along said major axis radially outwardly, a plurality of axially movable track members supported by said casing and disposed 360° about said shafts, a cam surface of each of said track members facing radially inwardly, means for individually axially displacing each of said track members, a non-deformable circular member provided between said cam follower and said plurality of track members and having an outside diameter less than the diameter of the circle formed by said plurality of track members, said cam follower abutting the inner surface of said circular member and yieldingly urging the said circular member against said cam surfaces of respective track members, a second coupling member attached to said output shaft above said planar surface, parallel arms of said coupling member projecting horizontally and an upwardly directed cylindrical projection of said first coupling member having a diameter less than the distance between said arms of said second coupling member and disposed therebetween providing a connection between said first and second coupling members.

References Cited by the Examiner

UNITED STATES PATENTS

| 2,249,656 | 7/1941 | Huband | 74—568 |
| 2,325,582 | 8/1943 | Andersen. | |
| 2,336,361 | 12/1943 | Lear | 74—63 |
| 2,589,852 | 3/1952 | Overacker | 74—63 |
| 2,826,082 | 3/1958 | Von Ranson | 74—63 |

FOREIGN PATENTS

| 721,410 | 12/1931 | France. |
| 955,665 | 4/1964 | Great Britain. |

BROUGHTON G. DURHAM, *Primary Examiner.*

D. H. THIEL, *Assistant Examiner.*